United States Patent
Bu et al.

(10) Patent No.: US 9,867,157 B2
(45) Date of Patent: Jan. 9, 2018

(54) METHOD FOR DETACHMENT OF MS MOVING BETWEEN COMMUNICATION SYSTEMS

(75) Inventors: Bing Bu, Beijing (CN); Xiaoqiang Li, Beijing (CN); Chunying Sun, Beijing (CN); Hong Wang, Beijing (CN); Lixiang Xu, Beijing (CN); Yanmin Zhu, Beijing (CN)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 696 days.

(21) Appl. No.: 12/527,328

(22) PCT Filed: Feb. 13, 2008

(86) PCT No.: PCT/KR2008/000843
§ 371 (c)(1),
(2), (4) Date: Dec. 28, 2009

(87) PCT Pub. No.: WO2008/100074
PCT Pub. Date: Aug. 21, 2008

(65) Prior Publication Data
US 2010/0093353 A1    Apr. 15, 2010

(30) Foreign Application Priority Data

Feb. 14, 2007  (CN) .......................... 2007 1 0080147

(51) Int. Cl.
*H04W 60/06*    (2009.01)
*H04W 76/06*    (2009.01)

(52) U.S. Cl.
CPC .......... *H04W 60/06* (2013.01); *H04W 76/062* (2013.01)

(58) Field of Classification Search
None
See application file for complete search history.

(56) References Cited

U.S. PATENT DOCUMENTS 6,535,493 B1 * 3/2003 Lee et al. ...................... 370/329
6,819,659 B1 * 11/2004 Palat et al. .................... 370/331

(Continued)

FOREIGN PATENT DOCUMENTS

WO    WO 98/37721       8/1998
WO    WO 2005/122626 A1 12/2005

OTHER PUBLICATIONS

3GPP Standard; Final Draft EN 301 344, 3rd Generation Partnership Project (3GPP), Mobile Competence Centre; Apr. 1, 1999.*

(Continued)

*Primary Examiner* — Diane Lo
(74) *Attorney, Agent, or Firm* — The Farrell Law Firm, P.C.

(57) ABSTRACT

A method for detachment of a mobile set within the equivalent route area moving between the communication systems comprising steps of: during the detachment process is implemented between a mobile set and a service node in one communication system, the service node generates one or more messages and transmits it to the service nodes in one or more communication system within the ERA. If the message is transmitted to the service node within the ERA of only one communication system, this service node transmits this message or the message generated according to this message to the service nodes within the ERA of the other communication system. With the method proposed in present invention, when a mobile is detached from two or more communication systems which share the same ERA, the service nodes in all communication systems within the ERA can still correctly manage the relevant information on this mobile set.

24 Claims, 6 Drawing Sheets

(56) References Cited

U.S. PATENT DOCUMENTS

| | | | |
|---|---|---|---|
| 7,107,055 | B2 | 9/2006 | Gallagher et al. |
| 7,512,104 | B2* | 3/2009 | Bjelland et al. ............ 370/338 |
| 8,032,133 | B2* | 10/2011 | Niemela et al. ........... 455/426.1 |
| 2002/0026482 | A1* | 2/2002 | Morishige et al. ........... 709/206 |
| 2002/0039367 | A1* | 4/2002 | Seppala et al. ............. 370/401 |
| 2003/0153309 | A1 | 8/2003 | Bjelland et al. |
| 2006/0229068 | A1 | 10/2006 | Niemela et al. |
| 2009/0111458 | A1* | 4/2009 | Fox et al. ................. 455/422.1 |
| 2009/0156201 | A1* | 6/2009 | Pudney et al. ............. 455/426.1 |

OTHER PUBLICATIONS

Written Opinion PCT/ISA/237 From Counterpart Application (4PP).
International Search Report PCT/ISA/210 (4PP).
"Digital Cellular Telecommunications System (Phase 2+); General Packet Radio Service (GPRS); Service Description; Stage 2 (GSM 03.60 Version 6.3.0 Release 1997)", 3GPP Standard; Final Draft EN 301 344, 3rd Generation Partnership Project (3GPP), Mobile Competence Centre; Apr. 1, 1999.
Siemens AG: "Deactivation of PDP Contexts in Case of GPRS Detach", 3GPP Draft; 3rd Generation Partnership Project (3GPP), Mobile Competence Centre; Jun. 7, 1999.
3rd Generation Partnership Project; Technical Specification Group Services and System Aspects; Digital Cellular Telecommunications System (Phase 2+); General Packet Radio Service (GPRS); Service Description; Stage 2 (Release 1998), 3GPP, 3GPP TS 03.60 V7.9.0, Sep. 2002.
3rd Generation Partnership Project; Technical Specification Group Services and System Aspects; 3GPP System Architecture Evolution; Report on Technical Options and Conclusions (Release 7), 3GPP, 3GPP TR 23.882 V1.7.0, Jan. 2007.
EN 301 344 V6.3.2 (Jul. 1999) European Standard (Telecommunications series), Digital cellular telecommunications sytem (Phase 2+); General Packet Radio Service (GPRS); Service description; Stage 2 (GSM 03.60 version 6.3.2 Release 1997), Copyright European Telecommunications Standards Institute 1999, pp. 107.
Chinese Office Action dated May 17, 2011 issued in counterpart application No. 200710080147.6, pp. 8.

* cited by examiner

METHOD FOR DETACHMENT OF MS MOVING BETWEEN COMMUNICATION SYSTEMS

PRIORITY

This application claims priority to Chinese Patent Application Serial No. 2007-10080147.6 filed Feb. 14, 2007; and to International Application PCT/KR2008/000843 filed Feb. 14, 2008; the contents of each of which are incorporated herein by reference.

BACKGROUND OF THE INVENTION

1. Field of the Invention

Present invention relates to a field of communication, especially to a method for a mobile set detaching from two or more communication systems that share the same equivalent route area (hereinafter referred to as ERA).

2. Description of the Related Art

In general, for the convenience of management, a service area of a mobile communication system can be divided into several different route areas (hereinafter referred to as RA) with each managed by a service node. After a mobile set is registered with a mobile communication system, it learns about the RA it locates. If a subscriber moves within the mobile communication system, when the mobile set finds out that it enters a new RA or it needs to initiate a periodical RA update process, it is necessary for this mobile set to carry out a RA update process. During the RA update process, if the service node changes, information on the mobile set will be eliminated from the original service node after it has been transferred to the new service node.

Generally, a detachment process may be performed so that: the mobile set informs the network that the mobile set no longer needs any service, or the network informs the mobile set that the network no longer offer any service for the mobile set. The mobile set may be detached either explicitly or implicitly. The explicit detachment means that either the network or the mobile set carries out the detachment process explicitly, while the implicit detachment means that the network detaches the mobile set without any notification. For instance, the system receives no message from the mobile set in a preset period of time, or an error (which can not be settled) happens to the physical link between the system and the mobile set. The process that the network detaches a mobile set may be initiated by either the service node (within the network) that offers service to the mobile set, or a home network register (hereinafter referred to as HSS) corresponding to the mobile set. After the detachment process completes, it is necessary to inform the HSS that the mobile set in state of detachment.

In general, when a mobile set moves from a service area of one mobile communication system to a service area in another new mobile communication system, the RAs of the two communication systems are different. In this case, it is necessary to perform a RA update process between the mobile set and the service node in the new mobile communication system. In addition, during this process, a series of processes may be implemented between the service node in the new mobile communication system and the original one to exchange relevant information to support the mobility of the mobile set. The two processes are necessary to be implemented once the mobile set returns the original communication system.

Now, an ERA method is adopted to effectively reduce the implementations of the process mentioned above during the mobile set switches between mobile communication systems. With this method, a RA of a mobile communication system and a RA of another mobile communication system are considered as one ERA. For the first time when a mobile set moves from a RA of a mobile communication system to a RA of another mobile communication system, the two service nodes of the two mobile communication systems exchange the relevant information on the mobile set so that the relevant information on the mobile set are saved in the service nodes of the two mobile communication systems. In this way, the fact that the mobile set moves within the ERA or enters a new mobile communication system is considered as that it moves within one RA of the same service node. Therefore, it is not necessary to perform any RA update process or corresponding information exchanging.

However, with the movement of the mobile set during the process that the mobile is detached from an equivalent route area (hereinafter referred to as ERA) shared by two or more communication systems, several available methods have no idea but support that the mobile set could be detached from only one of the communication systems. Therefore, in the case that the mobile is powered off, the service node of other communication system (but within the same ERA) learns about no relevant information yet. Thus, waste is caused to the system resource.

SUMMARY OF THE INVENTION

The object of this invention is to provide a method for detachment of a mobile set moving between two or more communication systems which share the same equivalent route area (hereinafter referred to as ERA), and all service nodes within the ERA of the communication systems may correctly manage relevant information on the mobile set correctly.

According to one aspect of present invention, a method for detachment of a mobile set within an ERA moving between communication systems comprising steps of:

a) a service node of a communication system sending a detachment request to the mobile set;

b) the service node sending a delete context request message for the mobile set to at least one of the other service nodes.

According to another aspect of present invention, a method for detachment of a mobile set within an ERA moving between communication systems comprising steps of:

a) the mobile set sending a detachment request to a service node of one communication system;

b) the service node sending a delete context request message for the mobile set to at least one of the other service nodes.

According to another aspect of present invention, a method for detachment of a mobile set within an ERA moving between communication systems comprising steps of:

a) a home network register in the mobile set sending a detachment request to a service node of one communication system;

b) the service node sending a delete context request message for the mobile set to at least one of the other service nodes.

With the method proposed in present invention, when a mobile set is detached from two or more communication systems which share the same ERA, the service nodes in all communication systems within the ERA may still correctly manage this mobile set's relevant information.

DETAILED DESCRIPTION OF THE PREFERRED EMBODIMENTS

Figure 1:
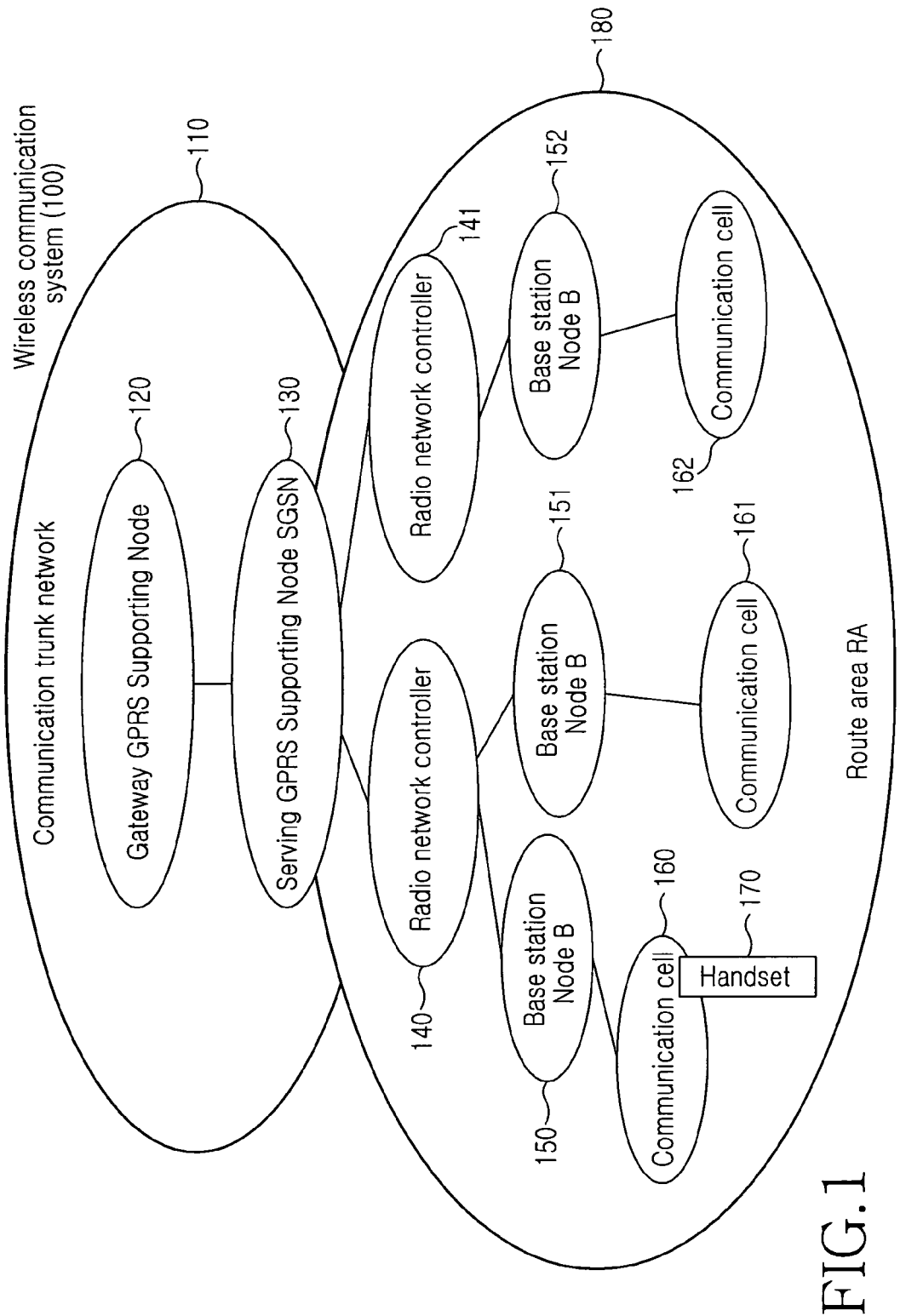
FIG. 1 shows a block diagram of a radio communication system in accordance with a preferred embodiment of present invention.

Present invention relates to a method for detachment of a mobile set between two or more communication systems which share the same equivalent route area (hereinafter referred to as ERA). With this method, when a mobile set is detached from two or more communication systems which share the same ERA, the service nodes in all communication systems within the ERA can still correctly manage the relevant information on this mobile set. During the detachment process is implemented between a mobile set and a service node in one communication system, the service node generates one message (or several different ones) and transmits it (or them) to the service nodes in one or more communication systems within the ERA. If the message is transmitted to the service node (within the ERA) in only one communication system, then this service node transmits this message (or the one(s) generated according to the message) to the service nodes (within the ERA) of the other(s) communication system(s). The service nodes within the ERA disable relevant information on the mobile set. The detachment process may be implemented between the service nodes within the ERA and the HSS in the mobile set.

Referring to drawings, the following description shows three preferred embodiments of communication system according to present invention. Especially, the communication system is a wireless communication system that follows at least one of the following communication standards. The standards may include but not be limited to an analogous, digital, or analogous/digital dual-mode communication system protocols. For instance (but not confined to), an advanced mobile phone system (referred to as AMPS), a narrow-band advanced mobile phone system (referred to as NAMPS), a global system for mobile communication (referred to as GSM), an enhanced data rate GSM evolvement (referred to as EDGE), a general packet radio service (referred to as GPRS), a universal mobile telecommunication system (referred to as UMTS), a frequency-division multiple access (referred to as FDMA), an IS-55 time-division multiple access (referred to as TDMA) digital cell, an IS-136 TDMA digital cell, an IS-95 code-division multiple access (referred to as CDMA) digital cell, an on-demand allocation modes (DA/TDMA, DA/CDMA, DA/FDMA), a wideband code-division multiple access (referred to as WCDMA), CDMA 2000, IMT-2000, a personal radio communication system (referred to as PCS/PHS), 3GPP, 3GPP2 and these protocols' varieties and evolvements. The communication system of present invention could further refer to all kinds of communication network system in the following description. A node in these communication systems needs to differentiate different subscribers. For example, the communication network system determines whether the subscriber that needs to access to it is a local subscriber or a roaming subscriber that roams into it; or different networks, for example, when a subscriber is accessing a communication network system, it should tell, whether the network to be accessed is the signed home network or visit network. It could include but not be limited to a local area network (hereinafter referred to as LAN hereinafter), a wireless local area network (hereinafter referred to as WLAN), etc. To avoid making the description ambiguous, detailed descriptions for functions or equipment that well known for those skilled in the art are omitted.

Referring to FIG. 1, a radio communication system 100 includes a backbone network 110, a group of radio network controllers (hereinafter referred to as RNC) 140 and 141, which jointly offer service within the route area 180. Generally, RNC handles signal coding/decoding, handover decision and access decision. Wireless communication system 100 could be, but not limited to a FDMA-based communication system, a TDMA-based communication system or a CDMA-based communication system. It is well known that the communication backbone network 110 includes GPRS support node GGSN 120, service GPRS support node SGSN 130. With the help one or more relevant base stations (hereinafter referred to as Node B) 150, 151 and 152, each of the RNCs 140 and 141 provides service in the communication cells 160, 161 and 162 within the entire route area 180. For sake of description convenience, RNC and Node B are described from the point of the invention. Whereas this doesn't mean the invention is only limited to RNC and Node B because base station controller (BTC), base station (BTS) and other similar techniques could be used to realize present invention, which is very obvious to technician of the art. Following practical standards, GGSN 120, SGSN 130, RNC 140 and Node B 150 offer radio communication service to mobile sets (hereinafter referred to MS) 170 within the communication cell 160. Every system part mentioned above could be obtained commercially, such as purchasing from Motorola Company.

Figure 2:
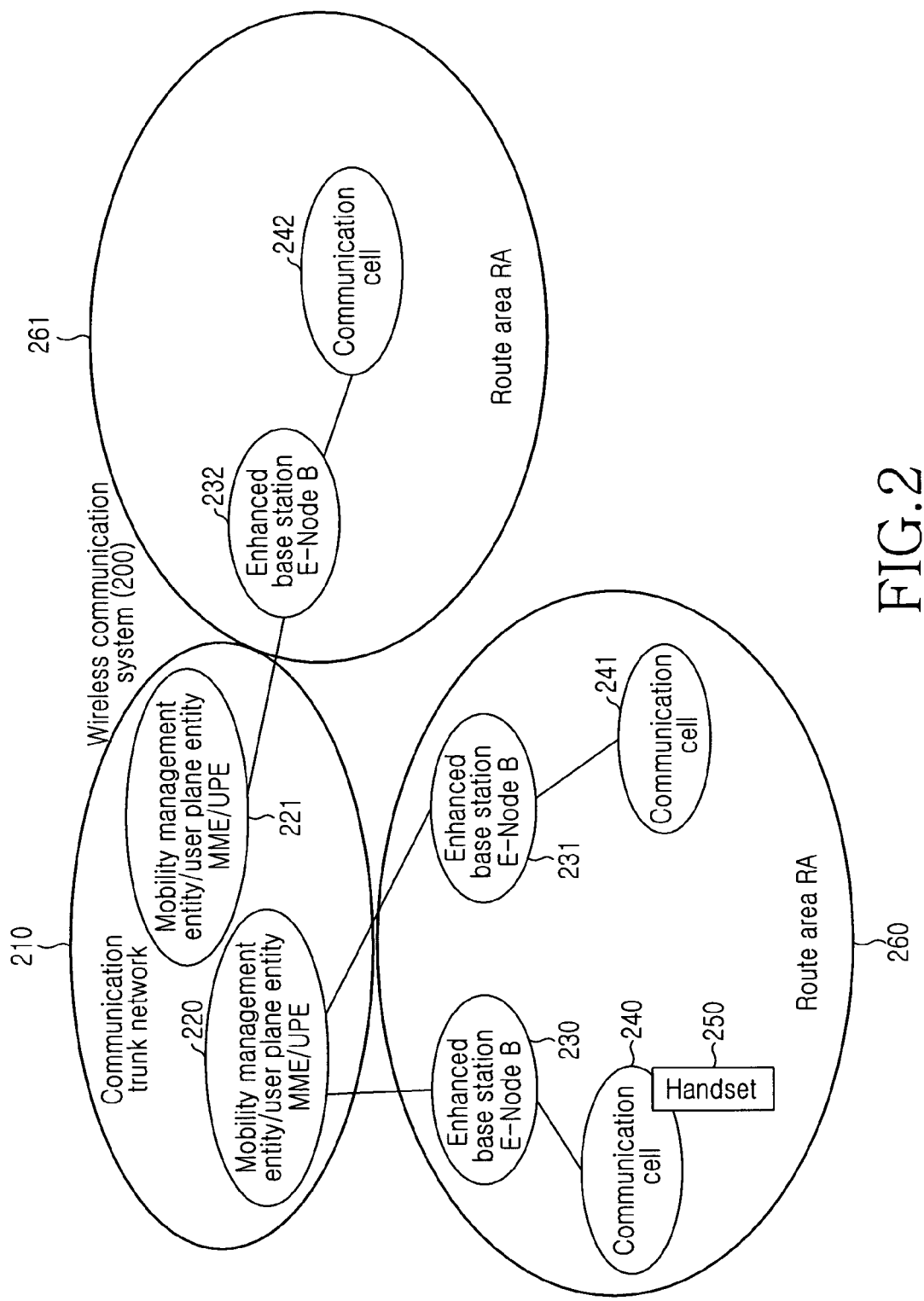
FIG. 2 shows a block diagram of another radio communication system in accordance with a preferred embodiment of present invention.

Referring to FIG. 2, a wireless communication system 200 comprises a communication trunk network 210, a group of enhanced base stations E-Node B 230 and 231, and they jointly provide services within the route area RA260. Wireless communication system 200 could be, but not limited to FDMA-based communication system, TDMA-based communication system or CDMA-based communication system. It is well known that the communication backbone network 110 includes the mobile management/user plane entity 220, which takes charge of signal encryption/decryption, handover decision and access decision. Each enhanced base station 230 and 231 provides services for all communication cell 240 and 241 in the whole route area. Following practical standards, MME/UPE 220 and E-Node B 230 offer radio communication service to mobile sets (hereinafter referred to as MS) 250 within the communication cell 240. Each system part mentioned above is expected to be obtainable commercially.

Figure 3:
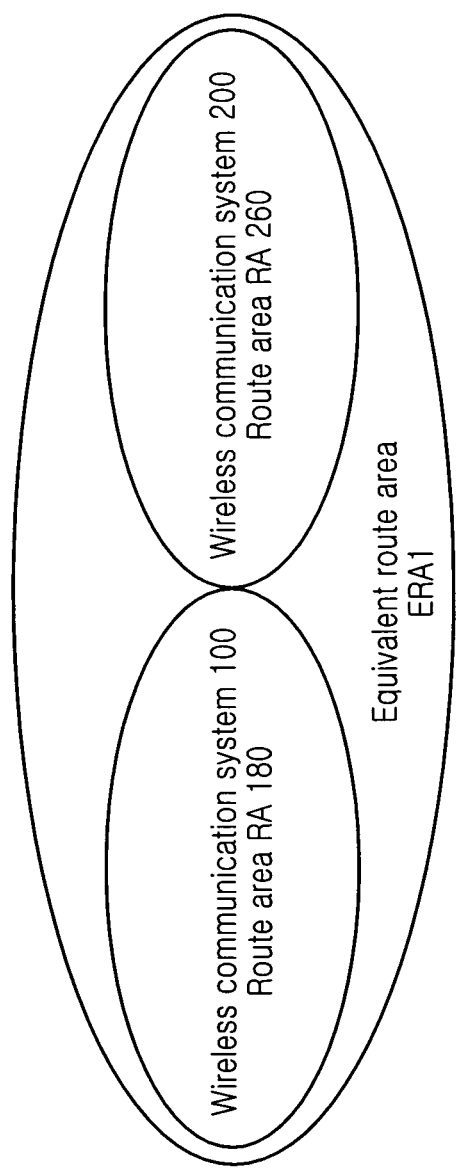
FIG. 3 illustrates an ERA in accordance with a preferred embodiment of present invention.

Referring to FIG. 3, the route area RA 180 of radio communication system 100 and the route area RA 260 of radio communication system 220 are jointly defined as an equivalent route area ERA1.

A First Embodiment

Figure 4:
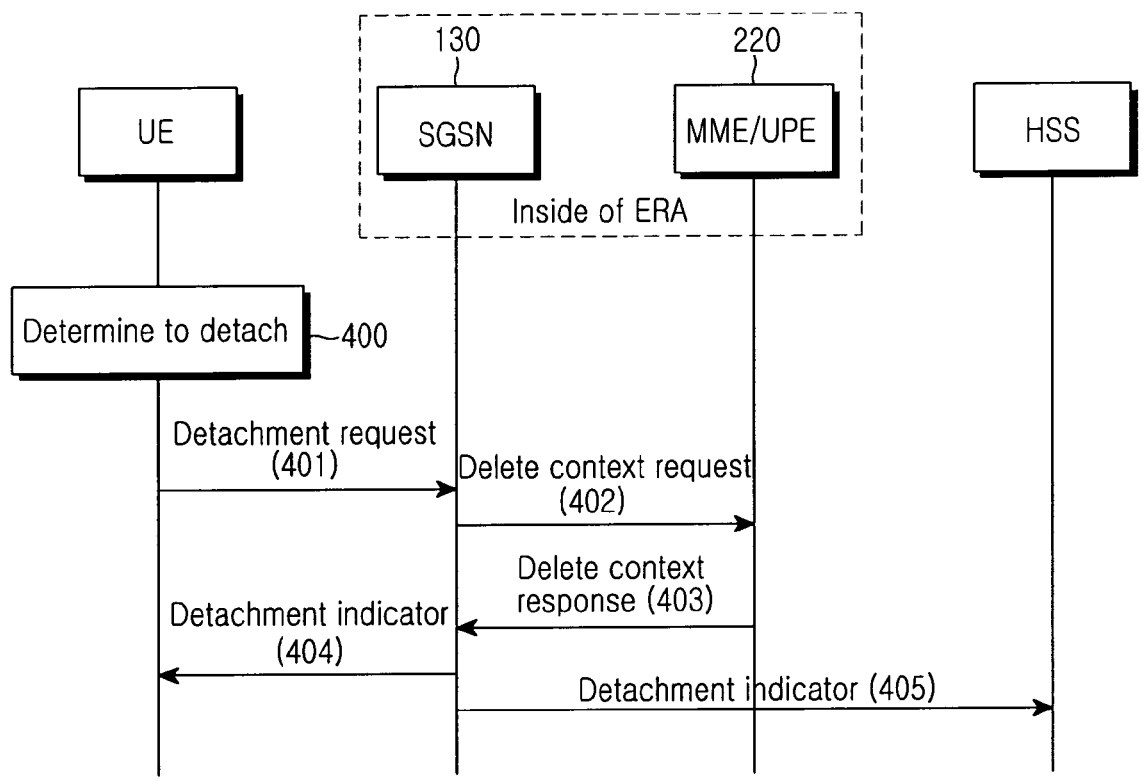
FIG. 4 illustrates a process of a first preferred embodiment of present invention.

In this embodiment, the detachment decision is made for a mobile set in the ERA shared by both the service node SGSN130 of the radio communication system 100 and the service node MME/UPE 220 of radio communication system 200. In practical, according to the current choice of the MS between radio communication system 100 and radio communication system 200, MS may transmit a detachment request to either service node SGSN 130 of radio communication system 100 or service node MME/UPE 200 of radio communication system 200. The implementations are similar in the two cases. To avoid making the description too tedious, detailed descriptions on the latter are omitted. FIG. 4 illustrates a process of the first preferred embodiment of present invention.

Step 400, the MS determines to be detached from the system.

Step 401, the MS sends the detachment request to the service node SGSN 130 of radio communication system 100.

Step 402, service node SGSN130 sends a context (corresponding to the MS) request message for deleting the MS to service node MME/UPE220 of radio communication system 200.

Service node SGSN130 obtains the location of service node MME/UPE220 through several optional methods.

One method is that, before step 400, through the processes like the configuration operations by the operator, SGSN130 has obtained that it shares the same ERA with node MME/UPE220. Therefore, after receiving the detachment request mentioned in step 401, the SGSN 130 transmits the delete context request message to the node MME/UPE220.

Another possible method is that, the MS includes information such as an address of the node MME/UPE220, an identifier of the node MME/UPE220, an identifier that node MME/UPE220 assigned to the MS, and (or) an identifier of a route area of the node MME/UPE220 of communication system 200 and so on into the detachment request in step 401. With the message(s), the service node SGSN130 may obtain the location of node ME/UPE220.

Step 403, service node MME/UPE220 sends a Delete Context Response to service node SGSN130.

Step 404, service node SGSN130 sends a Detachment Accept to the MS.

Step 405, service node SGSN130 sends the Detachment Indicator to HSS. In this embodiment, the information that HSS saves is about that MS is attached to node SGSN130. Actually, if the information that HSS saves is about that MS is attached to node MME/UPE220, then node MME/UPE220 can be adopted to send the Detachment Indicator to HSS.

Alternatively, in this embodiment, no time sequence exists between step 404 and steps 402 through 403.

Alternatively, in this embodiment, no time sequence exists between step 405 and steps 402 through 404.

Alternatively, service node SGSN130 disables and/or deletes the relevant context information on the MS after step 401.

Alternatively, service node MME/UPE220 disables and/or deletes the relevant context information on the MS after step 402.

A Second Embodiment

Figure 5:
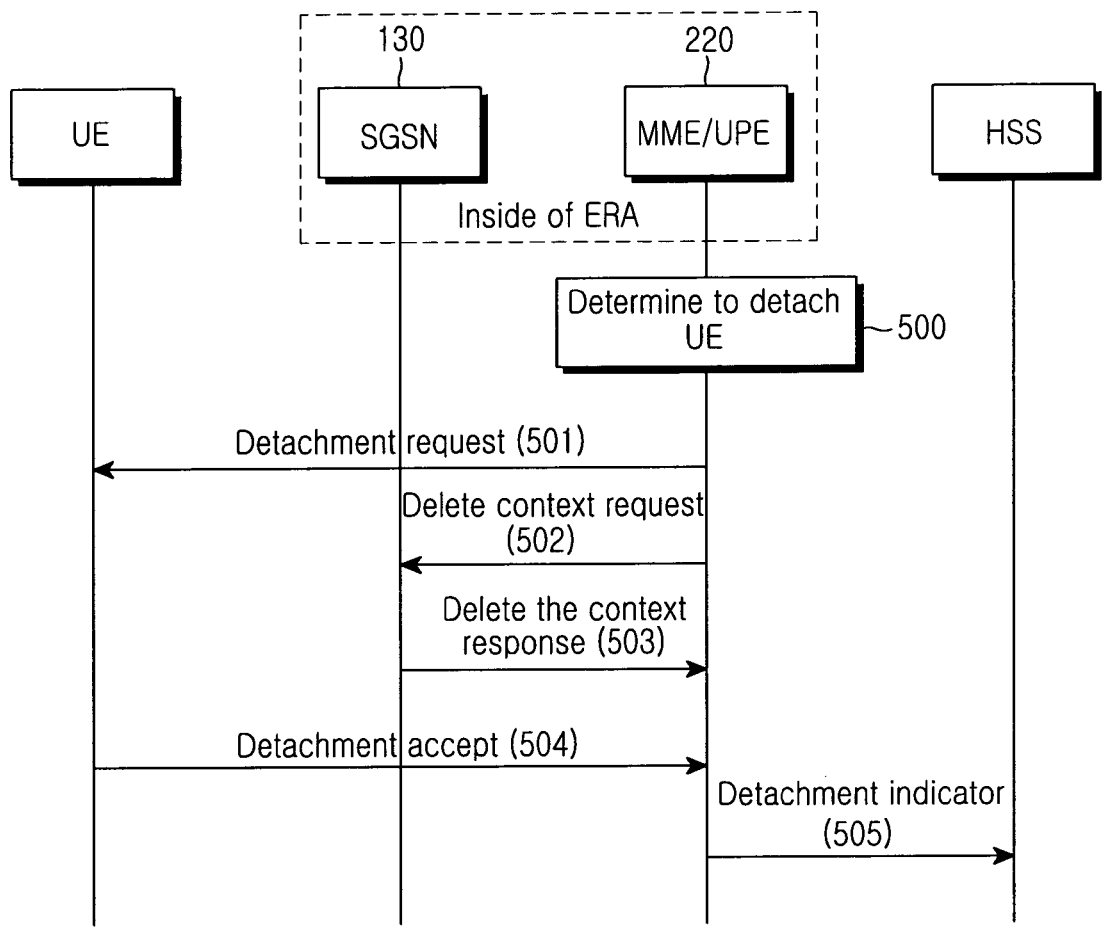
FIG. 5 illustrates a process of a second preferred embodiment of present invention.

In this embodiment, within the ERA shared by both the service node SGSN130 of the radio communication system 100 and the service node MME/UPE 220 of radio communication system 200, the service node MME/UPE220 determines to detach the UE. Similarly, the service node SGSN130 can also determine to detach UE. The implementations are similar in the two cases. To avoid making the description too tedious, detailed descriptions on the latter are omitted. FIG. 5 illustrates a process of the second preferred embodiment of present invention.

Step 500, MME/UPE220 determines to detach the UE.

Step 501, the service node MME/UPE220 sends the Detachment request to UE.

Step 502, service node MME/UPE220 sends the delete context request message to service node SGSN130 of radio communication system 100. Service node MME/UPE220 obtains the location of service node SGSN130 through several optional methods.

One method is that, before step 500, through the processes like the configuration operations by the operator, MME/UPE220 has obtain that it shares the same ERA with node SGSN130. Therefore, after receiving the detachment request mentioned in step 501, SGSN130 determines to transmit the delete context request message to node SGSN130.

Step 503, service node SGSN130 sends the Delete Context Response to service node MME/UPE220.

Step 504, the MS sends the detachment accept message to the service node MME/UPE220.

Step 505, the service node MME/UPE220 sends the Detachment Indicator to HSS. In this embodiment, the information that HSS saves is about that MS is attached to node MME/UPE220. Actually, if the information that HSS saves is about that MS is attached to node SGSN130, then node SGSN130 can be adopted to send the Detachment Indicator to HSS.

Alternatively, in this embodiment, no time sequence exists between step 504 and steps 502, through 503.

Alternatively, in this embodiment, no time sequence exists between step 505 and steps 502 through 504.

Alternatively, service node MME/UPE220 disables and/or deletes the MS's relevant context information after step 501.

Alternatively, service node SGSN130 disables and/or deletes the relevant context information on the MS after step 502.

The Third Embodiment

Figure 6:
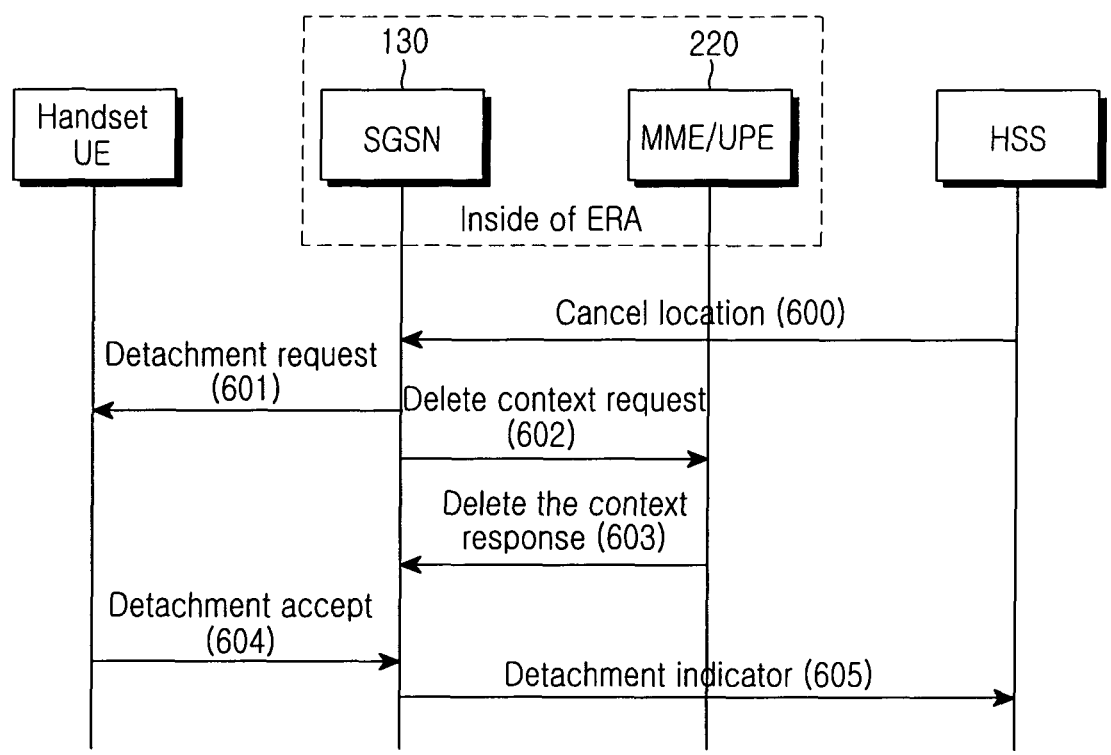
FIG. 6 illustrates a process of a third preferred embodiment of present invention.

In this embodiment, the MS locates in the ERA shared by both the service node SGSN130 of radio communication system 100 and the service node MME/UPE 220 of radio communication system. The HSS determines to detach UE. In fact, the information saved in HSS indicates which radio communication system MS locates: the radio communication system 100 or the radio communication system 200. The implementations are similar in the two cases. To avoid making the description too tedious, detailed descriptions on the latter are omitted. FIG. 6 illustrates a process of the third preferred embodiment of present invention.

Step 600, HSS sends a Cancel Location message to the service node SGSN 130 of radio communication system 100.

Step 601, the service node SGSN130 sends the Detachment request to UE.

Step 601, service node SGSN130 sends the delete context request message to service node MME/UPE220 of radio communication system 200. Service node SGSN130 obtains the location of service node MME/UPE220 through several optional methods. One method is that, before step 600, through the processes like the configuration operations by the operator, SGSN130 has learnt about that it shares the same ERA with node MME/UPE220. Therefore, after receiving the detachment request mentioned in step 601, the SGSN 130 may transmit the delete context request message to node MME/UPE220.

Step 603, service node MME/UPE220 sends the Delete Context Response to service node SGSN130.

Step 604, MS sends the detachment accept message to the service node SGSN130.

Step 605, the service node SGSN130 sends the Detachment Indicator to HSS.

Alternatively, in this embodiment, no order exists between steps 602 through 603 and step 601, 604 and 605.

Alternatively, service node SGSN130 disables and/or deletes the relevant context information on the MS after step 600.

Alternatively, service node MME/UPE220 disables and/or deletes the relevant context information on the MS after step 602.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A method for detachment of a mobile set moving between communication systems, comprising:
    a) transmitting, by a service node of a communication system, a detachment request to the mobile set;
    b) transmitting, by the service node, a delete context request message for the mobile set to a first service node of another communication system; and
    c) transmitting, by the service node, a detachment indicator to a second service node of the another communication system,
    wherein the service node of the communication system is different from the first service node of the another communication system,
    wherein both the service node of the communication system and the first service node of the another communication system store context information related to the mobile set, and
    wherein the mobile set moves between the service node of the communication system and the first service node of the another communication system without an area updating.

2. The method according to claim 1, wherein the service node of the communication system in step a) deletes context information related to the mobile set.

3. The method according to claim 1, wherein the first service node of the another communication systems in step b) deletes context information related to the mobile set.

4. The method according to claim 1, wherein the service node of the communication system and the first service node of the another communication system share a same Equivalent Route Area (ERA).

5. The method according to claim 1, wherein the order for performing step a) and b) is not limited.

6. The method according to claim 1, wherein the mobile set moves between the service node of the communication system and the first service node of the another communication system without updating an area.

7. A method for detachment of a mobile set moving between communication systems, comprising:
    a) receiving, by a service node of a communication system, a detachment request from the mobile set;
    b) transmitting, by the service node of the communication system, a delete context request message for the mobile set to a first service node of another communication system; and
    c) transmitting, by the service node, a detachment indicator to a second service node of the another communication system,
    wherein the service node of the communication system is different from the service node of the another communication,
    wherein both the service node of the communication system and the first service node of the another communication system store context information related to the mobile set, and
    wherein the mobile set moves between the service node of the communication system and the first service node of the another communication system without an area updating.

8. The method according to claim 7, wherein the service node of the communication system in step a) deletes context information related to the mobile set.

9. The method according to claim 7, wherein the first service node of the another communication systems in step b) deletes context information related to the mobile set.

10. The method according to claim 7, wherein the service node of the communication system and the first service node of the another communication system share a same Equivalent Route Area (ERA).

11. The method according to claim 7, wherein the order for performing step a) and b) is not limited.

12. The method according to claim 7, wherein the mobile set moves between the service node of the communication system and the first service node of the another communication system without updating an area.

13. An apparatus for detachment of a mobile set moving between communication systems by a service node of a communication system, comprising:
    a transmitter for transmitting a detachment request to the mobile set, transmitting a delete context request message for the mobile set to a first service node of another communication system, and transmitting a detachment indicator to a second service node of the another communication system,
    wherein the service node of the communication system is different from the first service node of the another communication system,
    wherein both the service node of the communication system and the first service node of the another communication system store context information related to the mobile set, and
    wherein the mobile set moves between the service node of the communication system and the first service node of the another communication system without an area updating.

14. The apparatus according to claim 13, wherein the service node of the communication system in step a) deletes context information related to the mobile set.

15. The apparatus according to claim 13, wherein the first service node of the another communication system in step b) deletes context information related to the mobile set.

16. The apparatus according to claim 13, wherein the service node of the communication system and the first service node of the another communication system share a same Equivalent Route Area (ERA).

17. The apparatus according to claim 13, wherein the order for performing step a) and b) is not limited.

18. The apparatus according to claim 13, wherein the mobile set moves between the service node of the communication system and the first service node of the another communication system without updating an area.

19. An apparatus for detachment of a mobile set moving between communication system by a service node of a communication system, comprising:
- a receiver for receiving a detachment request from the mobile set; and
- a transmitter for transmitting, by the service node, a delete context request message for the mobile set to a first service node of another communication system, and transmitting a detachment indicator to a second service node of the another communication system,
- wherein the service node of the communication system is different from the first service node of the another communication system,
- wherein both the service node of the communication system and the first service node of the another communication system store context information related to the mobile set, and
- wherein the mobile set moves between the service node of the communication system and the first service node of the another communication system without an area updating.

20. The apparatus according to claim 19, wherein the service node of the communication system in step a) deletes context information related to the mobile set.

21. The apparatus according to claim 19, wherein the first service node of the another communication system in step b) deletes context information related to the mobile set.

22. The apparatus according to claim 19, wherein the service node of the communication system and the first service node of the another communication system share a same Equivalent Route Area (ERA).

23. The apparatus according to claim 19, wherein the order for performing step a) and b) is not limited.

24. The apparatus according to claim 19, wherein the mobile set moves between the service node of the communication system and the first service node of the another communication system without updating an area.

* * * * *